United States Patent [19]

Rubin et al.

[11] 3,841,744

[45] Oct. 15, 1974

[54] MULTIPLE SLIDE PROJECTOR CONTROL SYSTEM

[75] Inventors: Lawrence M. Rubin, Souderton, Pa.; Richard Eaton, Rochester; Peter L. Chapin, Ilion, both of N.Y.

[73] Assignees: Lawrence M. Rubin, Souderton, Pa.; Richard Eaton, Rochester; Peter L. Chapin, Ilion, both of, N.Y.; Stanley Feingold, Lansdale, Pa. ; part interest to each

[22] Filed: Sept. 1, 1971

[21] Appl. No.: 176,958

[52] U.S. Cl. .................................. 353/15, 353/85
[51] Int. Cl. ............................................ G03b 31/06
[58] Field of Search ................................ 353/15–19

[56] References Cited
UNITED STATES PATENTS

| | | | |
|---|---|---|---|
| 2,811,588 | 10/1957 | Julie | 353/15 |
| 3,282,155 | 11/1966 | Cleary | 353/15 |
| 3,480,738 | 11/1969 | Meyer | 353/15 |
| 3,622,236 | 11/1971 | Novy | 353/86 |

Primary Examiner—Louis R. Prince
Assistant Examiner—A. Jason Mirabito
Attorney, Agent, or Firm—Seidel, Gonda & Goldhammer

[57] ABSTRACT

A multiple slide projector control system for producing a composite signal for recording on a single track of a recording medium. The composite signal may contain information for controlling the slide change mechanism and lamp intensity of a plurality of slide projectors with each function of each slide projector operable independent of any other. A composite signal reproduced from a single track of a recording medium may be processed by the control system to independently control the slide change and lamp intensity of each of a plurality of slide projectors.

5 Claims, 3 Drawing Figures

PATENTED OCT 15 1974
3,841,744
SHEET 1 OF 2
FIG. 1
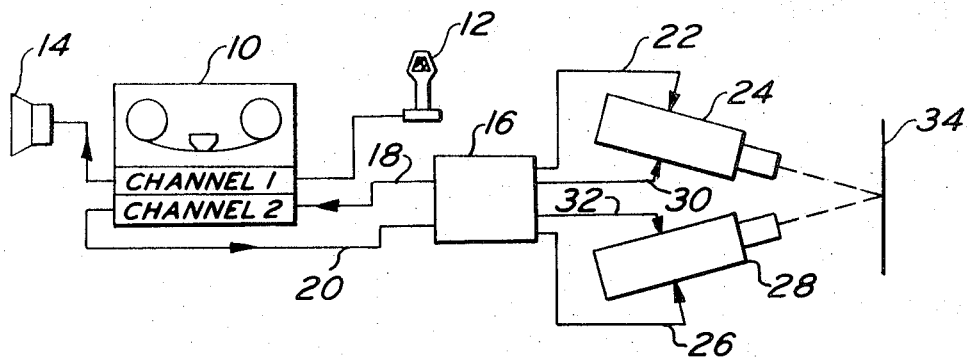
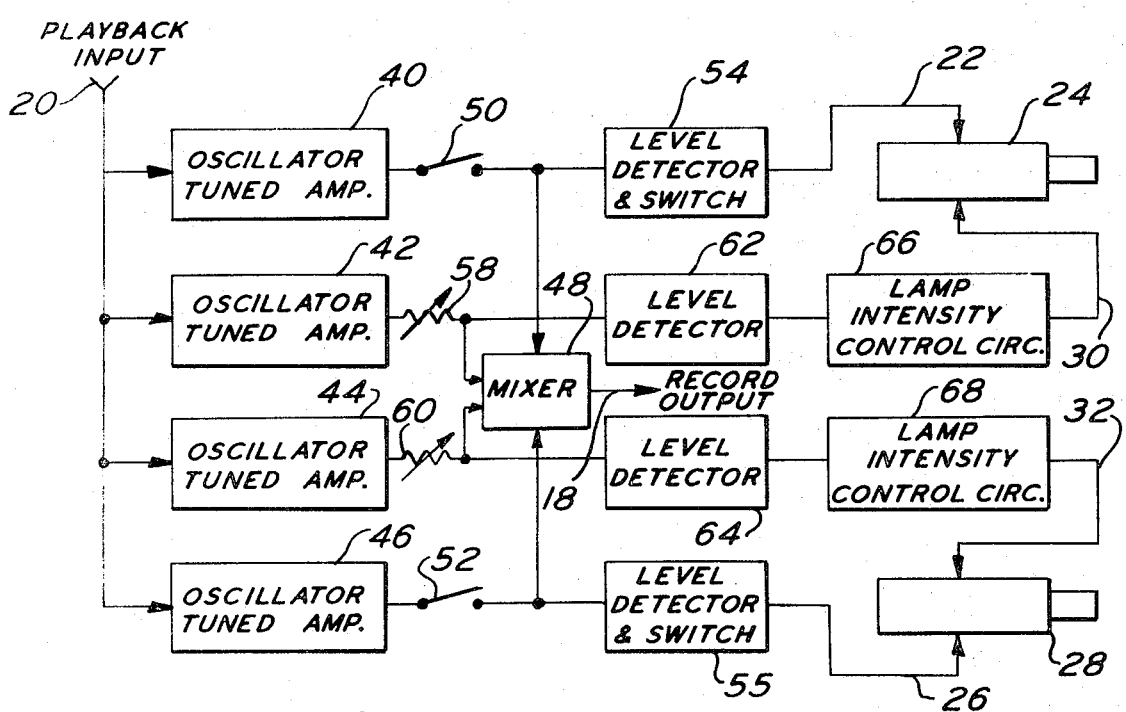
FIG. 2
INVENTORS
LAWRENCE M. RUBIN
RICHARD B. EATON
PETER L. CHAPIN
BY
*Seidel, Gonda & Goldhammer*
ATTORNEYS

MULTIPLE SLIDE PROJECTOR CONTROL SYSTEM

This invention relates to a multiple slide projector control system. More particularly, this invention relates to a multiple slide projector control system in which a composite signal may be produced for recording on a single track of a recording medium which may be used to independently control the slide change and intensity of a plurality of slide projectors. The control system of the present invention also allows monitoring of the visual effect produced by by the slide projectors due to the composite signal created. The control system of the present invention may be used to process the composite signal during playback in order to independently control the slide change and lamp intensity functions of a plurality of slide projectors.

It has been known in the prior art to use a cue signal recorded on a single track of a recording medium so as to effect the changeover between a pair of projectors. Control systems associated with these prior art slide projector controls also regulated the dimming of one of the projector lamps while simultaneously energizing the other towards maximum brilliance. However, no prior art slide projector control systems taught means of independently controlling the slide change and lamp intensity of each of a plurality of slide projectors by means of a composite signal recorded on a single track of a recording medium.

It is therefore an object of the present invention to provide a control system for producing a composite signal for recording on a single track of a recording medium which may be reproduced to independently control the slide change and lamp intensity of each of a plurality of slide projectors.

Another object of the present invention is to provide a control system in which the visual effects produced by the plurality of slide projectors may be viewed while the composite signal is being created and recorded.

A further object of the present invention is to provide a control system in which a composite signal reproduced from a single track of a recording medium may be processed in order to independently control the slide change and lamp intensity of each of a plurality of slide projectors.

A still further object of the present invention is to provide a control system in which the same apparatus may be used to create the composite signal for recording and to process the composite signal reproduced from the recording medium.

Briefly, the essence of the present invention is to use a plurality of oscillators or oscillator-tuned amplifiers to create a signal of different frequency for each function to be controlled. For example, in order to control the lamp intensity of a particular slide projector, the magnitude of the frequency signal corresponding to the lamp control for that particular slide projector is varied. In order to effectuate a slide change of a particular slide projector, the magnitude of the frequency signal corresponding to the slide change control of that particular slide projector is varied from a first predetermined level which may be zero to a second predetermined level. The outputs of the various oscillators or oscillator-tuned amplifiers are combined in a mixer means to provide a composite signal for recording on a single track of a recording medium.

In the playback mode of operation, the composite signal is fed back to a plurality of tuned amplifiers or oscillator-tuned amplifiers operating as tuned amplifiers. The output of each tuned amplifier will be proportional to the magnitude of the frequency signal to which it is tuned. The output of each tuned amplifier is fed to a level detector. In the case of the slide change, the level detector enables a switch when the magnitude of the frequency signal exceeds a predetermined amount. With respect to the lamp intensity control, the level detector causes the lamp intensity control circuit to increase the amount of power supplied to the slide projector lamp as the magnitude of the particular frequency signal increases.

For the purpose of illustrating the invention, there are shown in the drawings forms which are presently preferred, it being understood, however, that this invention is not limited to the precise arrangements and instrumentalities shown.

FIG. 1 is a simplified diagrammatic view of an installation with a control system of the present invention in a system containing a plurality of slide projectors and a recording means.

FIG. 2 is a block diagram of the control system of the present invention.

Figure 3:
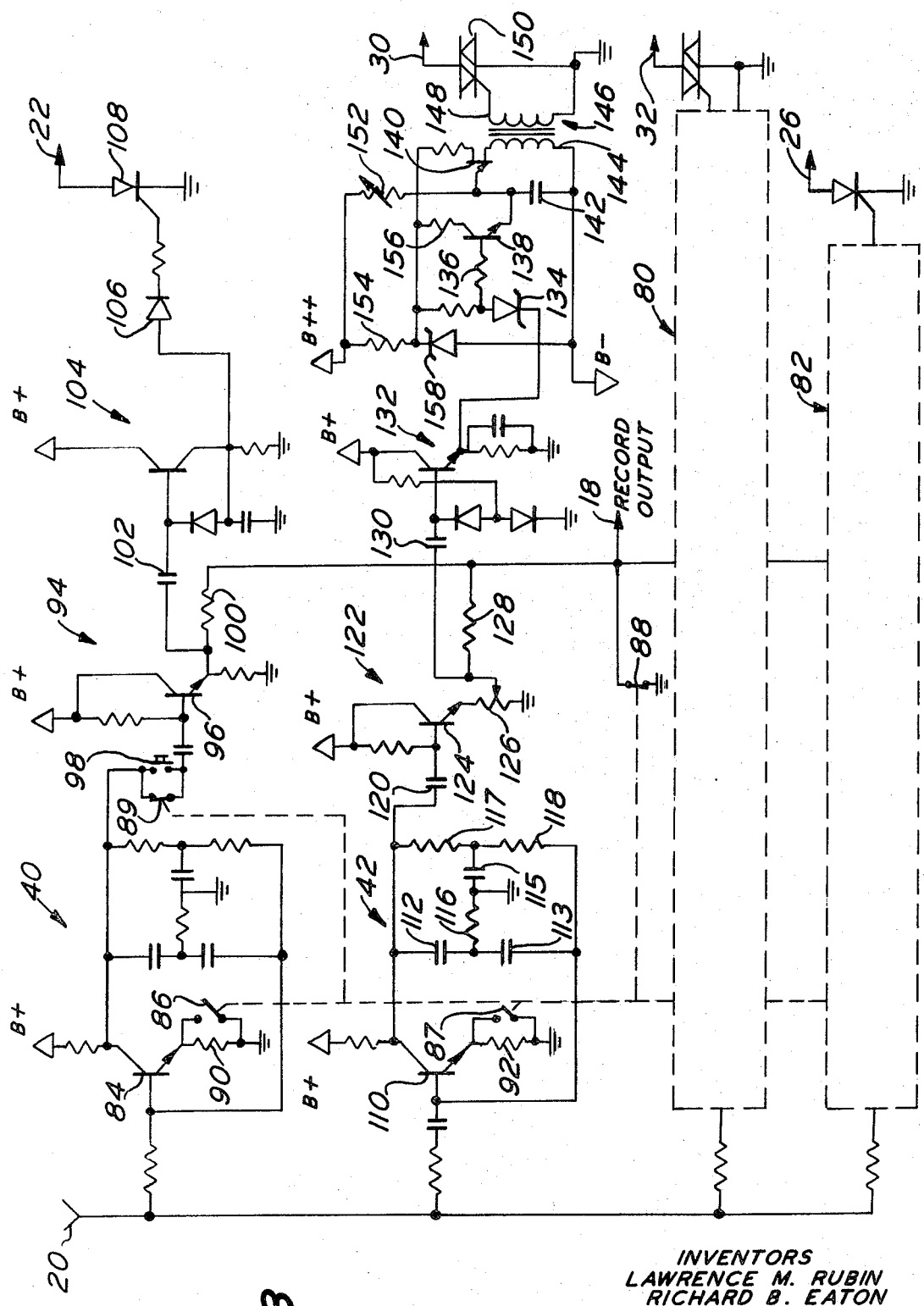
FIG. 3 is a schematic diagram, partially in dotted outline form, of the control system of the present invention.

Referring now to the drawings in detail, wherein like numerals indicate like elements, there is shown in FIG. 1 a recording-reproducing means 10 which may be a conventional two track magnetic tape recorder. Channel 1 of tape recorder 10 may be used for recording audio information through microphone 12. This recorded audio information may be reproduced as sound through speaker 14. The control system of the present invention is shown as block 16. The control system 16 has a record output 18 which is fed into channel 2 of tape recorder 10. A reproduced composite signal from channel 2 of tape recorder 10 may be fed into playback input 20 of control system 16. An output from control system 16 is fed via line 22 to slide projector 24 to control the slide change mechanism of slide projector 24. Similarly, a slide change signal is fed via line 26 to slide projector 28. Lamp intensity control signals are fed via lines 30 and 32 to slide projectors 24 and 28, respectively. Slide projectors 24 and 28 may be used to simultaneously project images on a screen 34.

Referring now to FIG. 2, there is shown in block diagram form circuitry of control system 16. Oscillators-tuned amplifiers 40, 42, 44 and 46 are conventional oscillators which may be converted to tuned amplifiers by switching in sufficient negative feedback to cancel out the positive feedback which causes oscillation. However, it is understood that the oscillators-tuned amplifiers 40, 42, 44 and 46 are the equivalent of separate oscillators in the record mode of operation and separate tuned amplifiers in the playback mode of operation. The oscillator-tuned amplifiers 40, 42, 44 and 46 are each tuned to a different frequency. For example, oscillators-tuned amplifiers 40, 42, 44 and 46 may be tuned to frequencies of 140 Hertz, 570 Hertz, 1400 Hertz, and 5700 Hertz, respectively. The oscillators-tuned amplifiers will oscillate at these frequencies respectively when in the record mode of operation and will amplify only their respective frequencies in the playback mode of operation.

The output of each of the oscillators-tuned amplifiers 40, 42, 44 and 46 is connected to a mixer 48. The output of the mixer 48 will provide the composite signal at terminal 18 for recording on a single track of a recording medium. The outputs of oscillators-tuned amplifiers 40 and 46 are connected through switches 50 and 52, respectively, to mixer 48. Switches 50 and 52 may be any type of switching device which changes from a high impedance to a low impedance when closed. Although shown as make-break switches, it is understood that switches 50 and 52 include variable resistors which change from a very high to a relatively low value of resistance. When switch 50 is closed, the output of oscillator-tuned amplifier 40 is applied to level detector and switch 54 which senses the change in level and actuates a switch which applies a slide change signal on line 22 to slide projector 24. The slide change of slide projector 28 is similarly activated through level detector and switch 55 by closing switch 52.

The magnitude of the outputs of oscillator-tuned amplifiers 42 and 44 may be varied by means of rheostats 58 and 60. The outputs of oscillator-tuned amplifiers 42 and 44 are applied to level detectors 62 and 64, respectively, in addition to being applied to mixer 48. Once these outputs exceed a minimum level determined by level detectors 62 and 64, signals are applied to lamp intensity control circuits 66 and 68, respectively. The outputs of lamp intensity control circuits 66 and 68 are applied to slide projectors 24 and 28, respectively, via lines 30 and 32. In order to produce the composite signal for recording on a single track, it would only be necessary to supply the outputs of oscillator-tuned amplifiers 40, 42, 44 and 46 to mixer 48. However, by also applying the outputs of oscillator-tuned amplifiers 40, 42, 44 and 46 to level detector and switch means 54 and 56 and level detectors 62 and 64, it is possible to visually monitor the effect created by the slide projectors 24 and 28 due to the composite signal being created.

In the playback mode of operation, oscillator-tuned amplifiers 40, 42, 44 and 46 are switched by switches, not shown in FIG. 2, to function as tuned amplifiers. The composite signal is applied to playback input terminal 20 and is thereby applied to each of the oscillator-tuned amplifiers 40, 42, 44 and 46. Oscillator tuned amplifier 40 would amplify the frequency signal and the composite signal corresponding to the frequency to which it is tuned, which for example, may be 140 Hertz. Switches 50 and 52 would be in a closed position in the playback mode of operation. Upon occurrence of a frequency signal in the composite signal corresponding to the frequency to which oscillator-tuned amplifier 40 is tuned, level detector and switch 54 will produce an output signal on line 22 causing slide projector 24 to initiate the slide change. Oscillator-tuned amplifier 46 and level detector and switch 55 operate in a similar manner upon the occurrence of a frequency signal of predetermined magnitude occurring in the composite signal which corresponds to the tuned frequency of oscillator-tuned amplifier 46. As a specific example mentioned above, oscillator-tuned amplifier 46 may be tuned to a frequency of 5700 Hertz. Oscillator-tuned amplifier 42 may be tuned to a frequency of 570 Hertz and oscillator-tuned amplifier 44 may be tuned to a frequency of 1400 Hertz. However, it is understood that these specific frequencies are given only by way of example and are not intended to be limiting. The only requirement is that each oscillator-tuned amplifier be tuned to a different frequency. The frequencies chosen may be spread further apart on the frequency spectrum or frequencies closer together on the frequency spectrum may be used by using more expensive filtering techniques and crystal controlled oscillators.

Oscillator-tuned amplifier 42 will amplify frequency signal of 570 Hertz appearing in the composite signal and apply it to level detector 62. Level detector 62 produces an output signal which is proportional to the magnitude of the 570 Hertz frequency signal above a predetermined minimum magnitude. Level detector 62 is used primarily to avoid having noise affect intensity of the slide projector lamp. The output of level detector 62 is applied to lamp intensity control circuit 66 which varies the current supplied to the lamp of slide projector 24. Oscillator-tuned amplifier 44, level detector 64 and lamp intensity control circuit 68 operate in a similar manner upon the occurence of a frequency signal having a frequency of 1400 Hertz. It is noted that each function may be operated independent of any other. That is, for example, both slide projectors 24 and 28 may have their lamp intensity simultaneously increased and their slide change mechanism operated. These functions may be operated in any combination desired.

Referring now to FIG. 3, there is shown a schematic diagram of one embodiment of circuitry which may be used to implement the block diagram of FIG. 2. The circuitry layout of FIG. 3 roughly follows the layout of the block diagram of FIG. 2. Dotted block diagram 80 corresponds to oscillator-tuned amplifier 44, level detector 64 and lamp intensity control circuit 68 of FIG. 2. Dotted block diagram 82 corresponds to oscillator-tuned amplifier 46, level detector and switch 55 and associated circuitry of FIG. 2. Referring to FIG. 3, there is shown an oscillator-tuned amplifier 40 comprised of transistor 84 connected in a resistance-capacitance tuned oscillator circuit which is conventional and well known in the art. Switches 86 through 89 along with the switches in block 80 and 82, not shown, are physically ganged together and are shown in the playback mode of operation. Switch 86 is used to short resistor 90 in the emitter circuit of transistor 84 in order to allow oscillation in the record mode of operation. Similarly, switch 87 shorts resistor 92 in the record operation thereby allowing oscillator-tuned amplifier 42 to oscillate. In the record mode of operation, switch 89 is open and a frequency signal of 140 Hertz is applied to emitter follower 94 composed of transistor 96 and associated circuitry only when the slide change pushbutton switch 98 is depressed. The output of the emitter follower 94 is applied through resistor 100 to record output 18. It is noted that switch 88 would be open in the record mode of operation and the record output would therefore not be grounded.

The output of emitter follower 94 is also applied through capacitor 102 to level detector 104 which is also conventional and well known in the art. The output of level detector 104 is applied through the protective diode 106 to the gate electrode of a thyristor 108. Therefore, when the output of emitter follower 94 exceeds a predetermined level determined by the components of level detector 104, a signal is passed through diode 106 turning on thyristor 108 which grounds line 22 and causes slide projector 24 of FIG. 2 to change slides. Similar circuitry would be provided in dotted outline 82 for grounding line 26 when a frequency signal of 5700 Hertz is present in the composite signal.

Oscillator-tuned amplifier 42 is similar to oscillator-tuned amplifier 40. In the reproduce mode, the switches 86–89 are as shown. Resistor 92 is therefore in the emitter circuit of transistor 110 causing a negative feedback signal to transistor 110 and preventing oscillation thereof. However, with switch 87 in a closed circuit position, transistor 110 will oscillate at a frequency determined by capacitors 112 through 115 and by resistors 116 through 118.

The output of oscillator-tuned amplifier 42 will be fed through capacitor 120 to emitter follower 122 comprised of transistor 124 and associated components. The emitter circuit of transistor 124 is provided with a potentiometer 126 for producing a variable output to vary the lamp intensity in the record mode of operation. In the reproduce mode of operation, the wiper arm of potentiometer 126 may be set to its maximum resistance position or, in other words, closest to the emitter of transistor 124. The output of emitter follower 122 is applied through resistor 128 to record output terminal 18. The outputs of the emitter followers 94 and 122 are combined in the resistor network comprised of resistors 100 and 128. The outputs of emitter followers in blocks 80 and 82 are similarly combined in the resistor network which includes resistors located in blocks 80 and 82.

The output of emitter follower 122 is also applied through capacitor 130 to level detector 132 which is also well known in the art. The output of level detector 132 is a voltage proportional to the magnitude of the 570 Hertz frequency signal above a predetermined minimum voltage determined by the components of level detector 132. The output of level detector 132 is applied through Zener diode 134 and resistor 136 to the base of transistor 138. Zener diode 134 allows the output of level detector 132 to be applied to the base of transistor 138 when the output level of level detector 132 exceeds a predetermined magnitude determined by the breakdown voltage of Zener diode 134.

Unijunction transistor 140, capacitor 142 and primary winding 144 of transformer 146 comprise a relaxation oscillator. That is, when capacitor 142 charges to a predetermined voltage, unijunction transistor 140 breaks down and capacitor 142 is discharged through the primary winding 144 of transformer 146. Each time unijunction transistor 140 breaks down and discharges capacitor 142, a pulse is induced in secondary winding 148 of transformer 146 and triac 150 is fired. Triac 150 controls the current flow to the lamp of slide projector 24 via line 30. Capacitor 142 is connected in series with variable resistor 152, which may be a background brightness control, between B++ and B—. The terminals B++ and B— may be the output terminals of an unfiltered full wave rectifier (not shown) which is well-known in the art. This circuit is a type well-known in the art and sometimes referred to as a ramp and pedestal circuit. In operation, capacitor 142 charges at the beginning of the half cycle of the rectified sine wave to a voltage directly proportional to the D.C. voltage from the output of level detector 132 applied through Zener diode 134. This charge on capacitor 142 forms the pedestal of the waveform. Capacitor 142 then charges through resistor 152 to form the ramp portion of the waveform. When the charge on capacitor 142 reaches the critical breakdown voltage of unijunction transistor 140, unijunction transistor 140 begins oscillation. The oscillation continues for the remainder of the half cycle of the rectified sine wave and the described operation is repeated in succeeding half cycles of the rectified sine wave.

It will be apparent to those skilled in the art that the multiple slide projector control system described herein may be used for controlling more than two slide projectors by adding additional channels which are tuned to separate or different frequencies. It will also be apparent that functions other than slide change and lamp intensity may be controlled. Furthermore, it is apparent that various changes and modifications may be made in the circuitry, or different devices used to produce the same function in the circuit. For example, various types of oscillators may be substituted for the oscillators disclosed herein. Other types of relaxation oscillators or power control circuitry may be used to control the power supplied to the slide projector lamps. Also, a slide change signal could be represented by a change between two magnitude levels of a particular recorded frequency as contrasted with a change between a zero level and a predetermined level other than zero.

In view of the above, the present invention may be embodied in other specific forms without departing from the spirit or essential attributes thereof and, accordingly, reference should be made to the appended claims, rather than to the foregoin specification as indicating the scope of the invention.

It is claimed:

1. Apparatus for providing a composite signal for recording on a single track of a recording medium, said composite signal being comprised of slide change and lamp intensity control signals for a first and a second slide projector comprising; first, second, third and fourth oscillator means for producing first, second, third and fourth frequency signals, respectively, each of said first second, third and fourth frequency signals being at a different frequency, said first and second oscillator means being provided with switching means for enabling an output from said first and second oscillator means to provide slide change signals for said first and second slide projectors, respectively, said third and fourth oscillator means being provided with means for varying their respective outputs to provide lamp intensity control signals for said first and second slide projectors, respectively, mixer means for receiving the outputs of said first, second, third and fourth oscillator means and for providing a composite signal to be recorded on a single track and first and second level detector and switch means for receiving the output of said first and second oscillator means to provide a slide change signal to said first and second slide projectors during recording of the output of said first and second oscillator means.

2. Apparatus as recited in claim 1 including third and fourth level detector means for receiving the outputs of said third and fourth oscillator means, respectively, first and second lamp intensity control circuit means for receiving the outputs of said third and fourth level detector means, respectively, and for providing lamp intensity control signals to said first and second slide projectors, respectively.

3. Apparatus for providing a composite signal for recording on a single track of a recording medium, said composite signal being comprised of slide change and lamp intensity control signals for a first and a second slide projector comprising; first, second, third and fourth oscillator means for producing first, second, third and fourth frequency signals, respectively, each of said first second, third and fourth frequency signals being at a different frequency, said first and second oscillator means being provided with switching means for enabling an output from said first and second oscillator means to provide slide change signals for said first and second slide projectors, respectively, said third and fourth oscillator means being provided with means for varying their respective outputs to provide lamp intensity control signals for said first and second slide projectors, respectively, mixer means for receiving the outputs of said first, second, third and fourth oscillator means and for providing a composite signal to be recorded on a single track and first and second level detector means for receiving the outputs of said third and fourth oscillator means, respectively, first and second lamp intensity control circuit means for receiving the outputs of said first and second level detector means, respectively, and for providing lamp intensity control signals to said first and second slide projectors, respectively.

4. Apparatus for producing slide change and lamp intensity control signals for a first and second slide projector from a composite signal composed of first, second, third and fourth frequency signals recorded on a single track of a recording medium comprising: first, second, third and fourth tuned amplifier means for receiving the composite signal, said first, second, third and fourth tuned amplifier means producing an output signal responsive to the magnitude of first, second, third and fourth frequency signals of the composite signal, respectively; first and second level detector and switch means for receiving the output of said first and second tuned amplifiers, respectively, and for providing a slide change signal to said first and second projectors, respectively; first and second level detector means for receiving the outputs of said third and fourth tuned amplifier means, respectively; first and second lamp intensity control circuit means for receiving the outputs of said first and second level detector means, respectively, and for providing a lamp intensity control signal to said first and second slide projectors, respectively.

5. Apparatus for providing a composite signal for recording on a single track of a recording medium and for producing slide change and lamp intensity control signals from the composite signal when retrieved from the single track of the recording medium, the composite signal being comprised of slide change and lamp intensity control signals for a first and a second slide projector comprising: first, second, third and fourth oscillator-tuned amplifier means, each of said oscillator-tuned amplifier means being provided with switch means enabling operation as an oscillator or as a tuned amplifier, each of said oscillator-tuned amplifier means being tuned to different frequencies, each of said first, second, third and fourth oscillator-tuned amplifier means providing an output frequency signal to a mixer means and to a first, second, third and fourth level detector means, respectively; switch means for disabling the output of said mixer means when said oscillator-tuned amplifier means are operating as tuned amplifiers; first and second switch means for receiving the outputs of said first and second level detectors, respectively, to produce slide change signals for said first and second slide projectors, respectively, first and second lamp intensity control circuit means for receiving the outputs of said third and fourth level detectors, respectively, and for providing lamp intensity control signals to said first and second slide projectors, respectively.

* * * * *